United States Patent
Zhang et al.

(10) Patent No.: US 8,929,941 B2
(45) Date of Patent: Jan. 6, 2015

(54) METHOD OF POWER CONTROL

(75) Inventors: Zhang Zhang, Beijing (CN); Mats Blomgren, Stockholm (SE); Fredrik Gunnarsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 598 days.

(21) Appl. No.: 13/264,475

(22) PCT Filed: Apr. 16, 2009

(86) PCT No.: PCT/SE2009/050389
§ 371 (c)(1),
(2), (4) Date: Oct. 14, 2011

(87) PCT Pub. No.: WO2010/120219
PCT Pub. Date: Oct. 21, 2010

(65) Prior Publication Data
US 2012/0052902 A1    Mar. 1, 2012

(51) Int. Cl.
| | | |
|---|---|---|
| H04B 7/00 | (2006.01) | |
| H04W 52/14 | (2009.01) | |
| H04W 52/12 | (2009.01) | |
| H04W 52/22 | (2009.01) | |
| H04W 52/24 | (2009.01) | |
| H04W 52/38 | (2009.01) | |
| H04W 52/40 | (2009.01) | |

(52) U.S. Cl.
CPC ............ *H04W 52/146* (2013.01); *H04W 52/12* (2013.01); *H04W 52/221* (2013.01); *H04W 52/245* (2013.01); *H04W 52/248* (2013.01); *H04W 52/386* (2013.01); *H04W 52/40* (2013.01)
USPC ................................ 455/522; 455/68; 455/69

(58) Field of Classification Search
CPC ..... H04W 52/04; H04W 52/06; H04W 52/08; H04W 52/10; H04W 52/12; H04W 52/146; H04W 52/221; H04W 52/248; H04W 52/386
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS 6,493,541 B1 * 12/2002 Gunnarsson et al. .......... 455/69
6,603,752 B1 * 8/2003 Saifuddin et al. ............ 370/335
(Continued)

FOREIGN PATENT DOCUMENTS

| EP | 0682418 A2 | 11/1995 |
|---|---|---|
| EP | 1503516 A2 | 2/2005 |

(Continued)

OTHER PUBLICATIONS
Gunnarsson, F. et al. "Time Delay Compensation in Power Controlled Cellular Radio Systems." IEEE Communications Letters, vol. 5, No. 7, Jul. 2001, pp. 295-297.
(Continued)

*Primary Examiner* — Dominic E Rego
(74) *Attorney, Agent, or Firm* — Coats & Bennett P.L.L.C.

(57) ABSTRACT

In a cellular radio system the power control status of a mobile station is used in the base stations to generate power control commands. Hereby a radio base station can select a power control method that is optimal for the situation at hand. This is obtained by communicating power control status to base stations or deriving power control status in a radio base station. The radio base station is adapted to select power control method based on the power control status. Thus, a base station can select the most suitable power control improvement method, even during soft handover, thereby making make use of the advantages of different types of power control improvement methods.

14 Claims, 3 Drawing Sheets

(56) References Cited

U.S. PATENT DOCUMENTS

| | | | |
|---|---|---|---|
| 7,110,436 B2 * | 9/2006 | Yanagi | 375/147 |
| 7,428,424 B2 * | 9/2008 | Hwang et al. | 455/522 |
| 7,899,485 B2 * | 3/2011 | Lundby et al. | 455/522 |
| 8,200,271 B2 * | 6/2012 | Baker et al. | 455/522 |
| 2005/0083999 A1 | 4/2005 | Koo et al. | |
| 2007/0072613 A1 | 3/2007 | Smolyar et al. | |
| 2007/0283174 A1 * | 12/2007 | Okazaki | 713/300 |
| 2008/0004064 A1 | 1/2008 | Sakurai et al. | |
| 2009/0262670 A1 * | 10/2009 | Cho et al. | 370/280 |
| 2010/0087219 A1 * | 4/2010 | Jonsson et al. | 455/522 |

FOREIGN PATENT DOCUMENTS

| | | |
|---|---|---|
| WO | 98/56200 | 12/1998 |
| WO | 01/03329 A1 | 1/2001 |
| WO | 2005002083 A1 | 1/2005 |
| WO | 2007069948 A1 | 6/2007 |

OTHER PUBLICATIONS

Coulon, P. et al. "Performance of Site Selection Diversity Transmission in WCDMA." The 5th International Symposium on Personal Multimedia Communications, vol. 1, Oct. 27-30, 2002.

Nasredding, J. et al. "Downlink Adaptive Power Control Algorithm for 3G Cellular CDMA Networks." 15ht IEEE International Symposium on Personal, Indoor and Mobile Radio Communications, 2004 (PIMRC 2004), Sep. 5-8, 2004.

Gunnarsson, F. et al. "Time Delay Compensation for CDMA Power Control." Submitted to GLOBECOM'00, San Francisco, CA, USA, Aug. 18, 2000.

Laakso, J. et al., "Radio Resource Management", WCDMA for UMTS, 2000, pp. 187-219 and pp. 283-302, John Wiley & Sons, Ltd.

* cited by examiner

METHOD OF POWER CONTROL

TECHNICAL FIELD

The present invention relates to a method and a device for controlling transmission power in a cellular radio system.

BACKGROUND

Power control is an important functionality used in the air interface of a radio system using Code Division Multiple Access (CDMA). Power control is used to continuously adjust transmission power such that the perceived quality is sufficiently but not excessively good. The aim is to ensure that not more than necessary interference is generated, thereby improving the overall system performance.

There are two power control loops, the inner loop and the outer loop. The outer loop power control is adapted to adjust the Signal to Interference plus Noise Ratio (SINR) target so that the desired Quality of Service (QoS) requirement is met. The inner loop power control adjusts transmission power so that the SINR perceived by the receiver is close to the SINR target. The power control is implemented by sending power control commands via so called Transmission Power Control (TPC) bits. To increase power the TPC bit indicates "up" and to decrease the power the TPC bit indicates "down". The power control command is obtained by comparing the received SINR with the SINR target.

The convergence of inner loop power control can be further improved by e.g. utilizing the previous power control commands at either the transmitter or the receiver. More specifically, Utilizing the already generated power control commands at the transmitter could help to compensate the time delay in the power control loop, see Fredrik Gunnarsson, Fredrik Gustafsson, "Time Delay Compensation for CDMA Power Control" and the international patent application No. WO 01/03329 A1, which may range from 2 or 3 time slots to 7 or 8 time slots.

Utilizing the already received power control commands at the receiver this could help to realize the adaptive adjustment of inner loop power control step size, see Jad Nasreddine, Louffi Nuagmi and Xavier Lagrange, "DOWNLINK ADAPTIVE POWER CONTROL ALGORITHM FOR 3G CELLULAR CDMA NETWORKS."

It has been shown that both of the improvements can decrease the SINR oscillations around the SINR target and thus lead to improved performance, by allowing for decreased mobile station transmission power and consequently decreased interference. This is in particular so for mobile stations, which are not in soft handover, i.e. the mobile stations that are only connected to one base station and solely power controlled by that base station. However, the situation during soft handover may be different. A mobile station in soft handover is connected to two or more base stations and may be power controlled by any of the connected base stations. Each connected base station transmits its own power control command to the mobile station, and the mobile station combines the received power control commands in the following way:

A power increase only if all the power control commands indicate "up"

Otherwise power is decreased.

This implies that when more than one base station power controls a mobile station neither of the base stations to which the mobile station is connected, can know that the mobile station follows its power control command, and utilizing already generated power control commands at the base stations cannot help to improve the convergence of inner loop power control. There are some ways to solve this:

Do not utilize the already generated power control commands at the base stations when a mobile station is in soft handover, see Fredrik Gunnarsson, Fredrik Gustafsson, "Time Delay Compensation for CDMA Power Control."

Utilize other measures at the base stations which are valid in soft handover as well, i.e. even the base station cannot make sure that if its power control commands are followed by the connected mobile station, to improve the inner loop power control converge. One such measure is the most recent received signal code power (RSCP).

However, simply disabling the utilization of the already generated power control commands at the base stations in soft handover has a drawback because mobile stations in soft handover cannot compensate the time delay in their power control loop and thus have larger SINR and consequently also power oscillation. Typically there is around 20% to 30% mobile stations in soft handover, and it is mainly the mobile stations around cell border that are in soft handover, which have relatively high power and generate relatively high interference. It is therefore probably more important to improve the power control performance for mobile stations in soft handover.

Some measures, e.g. the most recent RSCP at the base station, are valid no matter whether the base station is in soft handover or not. However, the solutions based on this measure also have some drawbacks, including:

It can only compensate the generating delay but not the transmitting delay in power control commands. This is because RSCP can only reflect the effect of the power control commands that are already applied at the mobile station, but not the effect of the power control commands that are already generated but not yet applied at the mobile station, see Jad Nasreddine, Louffi Nuagmi and Xavier Lagrange, "DOWNLINK ADAPTIVE POWER CONTROL ALGORITHM FOR 3G CELLULAR CDMA NETWORKS."

There exists estimation error in RSCP estimation, and in some cases this error may become relatively large, e.g. when sequential interference cancellation (SIC) is applied. This is because SIC introduces additional processing delay, and to compensate for this delay we need to adopt the RSCP estimation before SIC, which suffers from higher interference and is thus more unreliable, see Fredrik Gunnarsson, "Uplink Sequential IC and Power Control Behavior," EAB-08:039083.

The benefit from the RSCP based solution is less than that from the power control commands based solution when e.g. the base station is not in soft handover.

Hence, there exist a need for a method and a system that is able to provide an improved power control for soft handover in a cellular radio system.

SUMMARY

It is an object of the present invention to overcome or at least reduce some of the problems associated with existing methods and systems for power control.

This object and others are obtained by the method and device as set out in the appended claims.

Thus, as has been realized by the inventors, there is a problem when more than one base station power controls the power control setting in a mobile station because neither of the base stations can know that the mobile station follows its power control command, thus the solution based on already generated power control commands becomes ineffective. The inventors have further realized that if the base stations are provided with the power control status, i.e. whether their power control commands are currently followed by the connected mobile station, or more generally, to what extent the power control commands are followed, the power control commands based solution can still be applied for the power controlling base station, with the power control commands being currently followed by the connected mobile station. Thus, in accordance with the present invention a communication/determination of the power control status of a mobile station is sent to the base stations and the radio base stations are adapted to generate power control commands using the power control status communication as an input signal.

In accordance with one embodiment, for the non-power controlling base stations, the corresponding power control improvement procedure can be disabled. As an alternative an RSCP based solution can be applied for the non-power controlling base stations, which can improve the performance to some extent especially when the generating delay of power control commands is dominant.

In accordance with one embodiment the power control status is communicated to a base station using a central node, such as a Radio Network Controller (RNC). In an RNC centric communication implementation, the RNC can be adapted to decide and to communicate to the base station whether it should power-control the mobile station.

In accordance with one embodiment the power control status is communicated to a base station using a base station centric approach. In a base station centric communication implementation each base station is adapted to independently determine the power control status. The power control status can for example be determined by analyzing the power control commands and/or RSCP patterns.

In accordance with one embodiment the power control status is communicated to a base station using a mobile station centric approach. In a mobile centric communication implementation, a mobile station itself is adapted to determine the power control status and to communicate the status to a base station and in particular to all connected base stations.

The invention also extends to a mobile station, a radio base station and a radio network controller adapted to implement the methods as set out above.

BRIEF DESCRIPTION OF THE DRAWINGS

The present invention will now be described in more detail by way of non-limiting examples and with reference to the accompanying drawings, in which.

DETAILED DESCRIPTION

Figure 1:
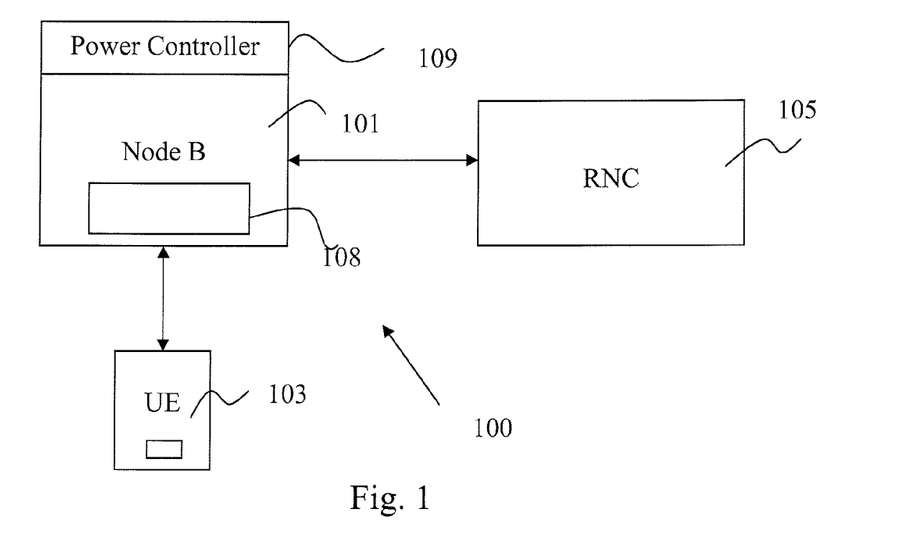
FIG. 1 is a view illustrating a cellular radio system.

In FIG. 1 a view illustrating a cellular radio system 100 is depicted. The system comprises a number of radio base stations here denoted Node B 101. The Node Bs 101 can be connected to a central node such as a Radio Network Controller (RNC) 105. The base stations 101 are further connectable to mobile stations also denoted User Equipments (UE) 103 of the radio system 100 over a radio interface. In order to control the power of the mobile stations the radio base station can send power control commands using a power controller. The method used for sending power control commands is determined by a selector 108. The selector 108 can, as set out above, also be located in a central node, such as in a RNC 105. In addition the radio base station comprises a power controller 109 adapted to transmit power control commands to connected mobile stations.

As described above, there exist different methods for improving the power control performance. One type of method performs well only when the base station can be sure that the connected mobile station follows its power control command; another type of method provides less improvement but can also work even the base station is not sure about its power control status, i.e. whether the connected mobile station follows its power control commands. Whether a connected mobile station follows power control commands from a radio base station is in the following referred to as power control status or simply status. In accordance with the present invention, the advantages of both types of power control methods described above can be achieved by providing information to the base station relating to the power control status of the mobile station.

Hence, in accordance with the present invention, the power control status of a mobile station connected to a radio base station is communicated to the power controller of the radio base station and used as an input signal to the transmission power controller. As a result the radio base station can use a power control method optimized for the status of the mobile station. This will improve the power control in the radio system and result in a more efficient use of radio resources in the cellular radio system.

The power control status of the mobile stations is in accordance with one embodiment communicated to the base stations. Based on the communicated power control status, the radio base stations select a power control method. The power control status of a mobile station can be determined at different nodes of a cellular radio system, e.g. in a central node such as the Radio Network Controller (RNC), in a radio base station, or in a mobile station, and then communicated to the base stations (no communication is needed if the determination is made in the base station). In one embodiment the mobile stations can be adapted to provide some information to the connected base stations to help the radio base station to determine the power control status. In such an embodiment the power control can be based on status information derived as a combination of communication from a mobile station and information derived within a radio base station. Other methods of power control based of communication from more than one node can also be envisaged.

Figure 2:
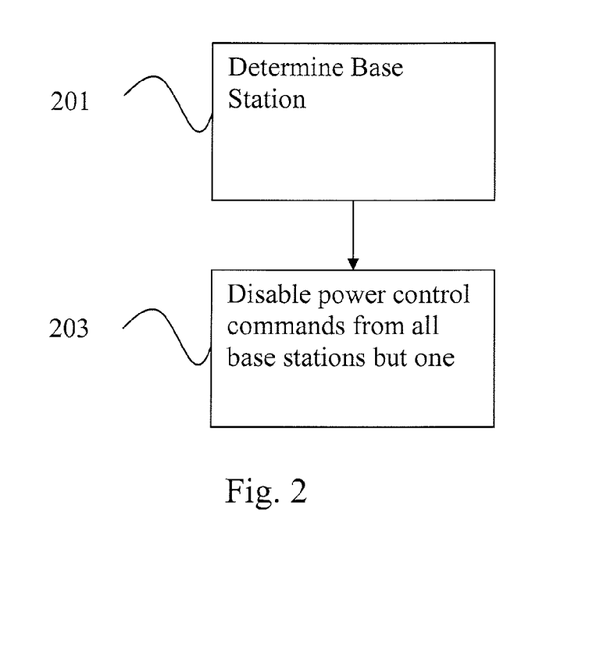
FIG. 2 is a flow chart illustrating steps performed in a power control method in accordance with a first embodiment.

In accordance with one embodiment an RNC centric scheme is provided. In FIG. 2, a flow chart illustrating some procedural steps performed when performing power control of a mobile station in such an embodiment is depicted.

In a system employing an RNC centric scheme, the RNC can be set to select one radio base station to control the mobile station and to disable power control commands from form other radio base stations to which the mobile station is connected. Thus, the RNC selects one radio base station to power control the mobile station in a step 201. The selection can for example involve the step of determining which base station has the best average radio link set to the connected mobile station in step 201. Based on that determination, the RNC controls the radio base stations such that only one radio base station is enabled to transmit power control commands to the mobile station, in a step 203. For example, the radio base station with the best link is enabled to send power control commands to the mobile station, and the other radio base stations are disabled. Other methods of determining which radio base station that is to generate power control commands can also be used. Also the power control improvement method based on power control commands could be applied to further improve the performance. In response to commands sent from the RNC to the radio base stations the radio base stations enable or disable transmission of power control commands to the mobile station. Hereby, only one radio base station at the time will transmit power control commands to a particular mobile station.

Figure 3:
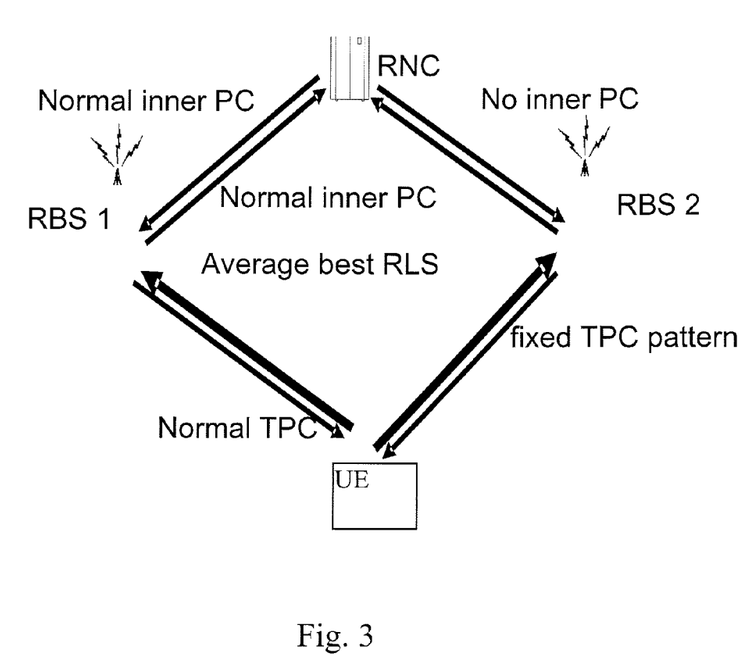
FIG. 3 is a view of a cellular radio system operating in accordance with a first embodiment.

Below a scenario illustrated in FIG. 3 is described to further illustrate an RNC centric scheme. Assume a mobile station in soft handover and connected to more than one base station. The mobile station has more than one radio link set. The RNC judges which uplink radio link set has the best quality in average based on e.g. (filtered) CPICH measurement (CPICH Ec/Io or CPICH RSCP) that is reported from the mobile station. The uplink/downlink quality difference could be compensated on average by using the information about e.g. feeder differences and TMA configurations.

In the scenario of FIG. 3, the power control status is first determined based on whether the base station has the best average radio link set (in uplink):

Only the base station that has the best average radio link set (in uplink) should power control the connected mobile station so that the Signal to interference plus Noise ratio (SINR) perceived by that base station is close to the SINR target.

The base station(s) that do not have the best average radio link set (in uplink) should not power control the connected mobile station. This can be implemented in various ways, for example:

Continuously sending "up" power control commands.

Alternatively sending "up" power control commands and "down" power control commands.

In this way the mobile station actually follows the power control commands from the base station that has the best average radio link set (in uplink).

Next, the RNC informs the base stations which of them should power control the mobile station. The power control improvement method based on power control commands can be applied at the base station that has the best average radio link set (in uplink) and is power controlling the mobile station. Selective combining can still be performed at RNC.

Optionally some "down" power control commands could be sent from the base station(s) with the non-best average radio link set when it is detected that the estimated SINR of the non-best average radio link set is continuously higher than the SINR target for a certain time.

Figure 4:
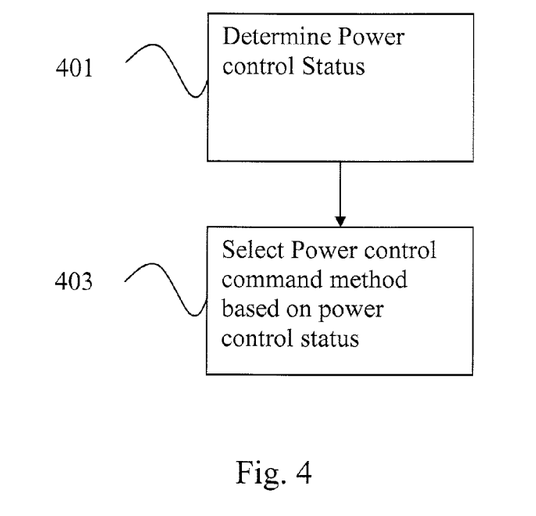
FIG. 4 is a flow chart illustrating steps performed in a power control method in accordance with a second embodiment.

In accordance with one embodiment a base station centric scheme is provided. In FIG. 4, a flow chart illustrating some procedural steps performed when performing power control of a mobile station in such an embodiment is depicted. In accordance with this embodiment each base station independently determines the power control status, i.e. whether its power control command is followed by the connected mobile station, based on a comparison of the already generated power control commands sequence and the observed relative RSCP sequence. The power control improvement method is selected based on the power control status. Thus, first in a step 401 the power control status for a particular mobile station is determined by the radio base station. Next, in a step 403, the radio base station generates power control signals based on the power control status. In particular the radio base station can be adapted to select power control method in response to the determination made in step 401.

Below an exemplary scenario is described. In a cellular radio system, each base station independently compares the power control commands sequence generated for a certain connected mobile station with the observed relative RSCP sequence received from the same mobile station (the sequence length (m) is configurable), an exemplary sequence is shown below, where the generated TPC sequence, the RSCP sequence and the relative RSCP sequence are listed.

Generated TPC sequence: [1, 1, −1, −1, 1, −1] (dB)

RSCP sequence: [−93.9, −93.2, −92.3, −93.4, −94.2, −93.3, −93.8] (dBm)

Relative RSCP sequence: [0.7, 0.9, −1.1, −0.8, 0.9 −0.5] (dB)

If the sequences are sufficiently similar as determined by some measure, it is regarded that the power control commands from that base station is (almost) followed by the mobile station.

The two sequences can for example be determined to be sufficiently similar if:

More than a certain ratio (e.g. 90%) that the relative RSCP measurements and the generated power control commands have the same sign, or More than a certain ratio (e.g. 90%) that the difference between the relative RSCP measurements and the generated power control commands is smaller than a predefined threshold (e.g. 0.5 dB).

Otherwise it is regarded that the power control commands from that base station is only partly or even not followed by the mobile station.

Based on the determination if a particular mobile station follows the power control commands from a radio base station, the radio base station selects a power control method. For example, each base station selects power control improvement methods based on the power control status as follows:

Power control commands based power control improvement method can be applied for a base station which power control commands are followed or followed to a to a suitable target value by the connected mobile stations, even when the base station is in soft handover.

a RSCP based power control improvement method can be applied for a base station which power control commands are only partly or not followed by a connected mobile station, especially when the generating delay of power control commands is dominant.

The accuracy in determining the power control status will impact the system performance to a large extent. This accuracy could be improved by using any of the methods listed below (or the combinations of them):

Increase the length (m) of power control commands sequence and the relative RSCP sequence.

Instead of comparing each power control command to each relative RSCP measurement, it is possible to compare the accumulative change over every n power control commands to that over every n relative RSCP measurements. This gives totally ⌊m/n⌋ observations, as illustrated below where a comparison of accumulated change in generated power control commands sequence and that in relative RSCP sequence, accumulated over two slots is shown.

Generated TPC sequence: [1, 1, −1, −1, 1, −1] (dB)

Accumulative TPC changes over two slots [2, −2, 0] (dB)

RSCP sequence: [−93.9, −93.2, −92.3, −93.4, −94.2, −93.3, −93.8] (dBm)

Relative RSCP sequence: [0.7, 0.9, −1.1, −0.8, 0.9-0.5] (dB)

Accumulative relative RSCP changes over two slots: [1.6, −1.9, 0.4] (dB)

The power control commands sequence and the relative RSCP sequence can be regarded similar based on any suitable criteria. Examples of suitable criteria can be:

If more than a certain ratio (e.g. 90%) of the accumulated change in the relative RSCP measurements and that in the generated power control commands have the same sign, or If more than a certain ratio (e.g. 90%) of the difference between the accumulated change in the relative RSCP measurements and that in the generated power control commands is smaller than a predefined threshold (e.g. 0.5 dB).

In accordance with one embodiment RSCP measurements after Successive Interference Cancellation (SIC) are used in case SIC is adopted, since the RSCP measurements after SIC are more reliable. This may delay the determination of the power control status (up to several slots depending on the adopted SIC scheme.

Figure 5:
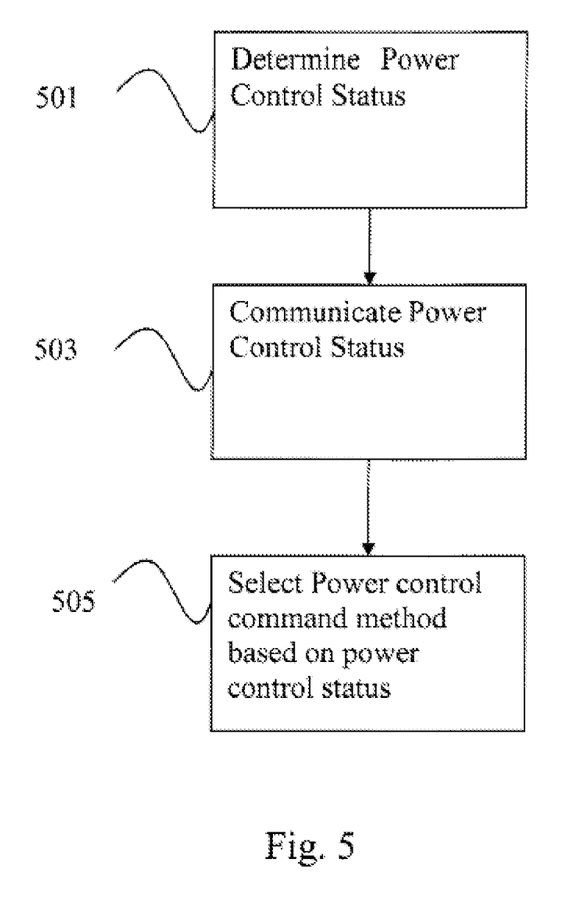
FIG. 5 is a flow chart illustrating steps performed in a power control method in accordance with a third embodiment.

In accordance with one embodiment a mobile station centric scheme is provided. In FIG. 5, a flow chart illustrating some procedural steps performed when performing power control of a mobile station in such an embodiment is depicted. In accordance with such a method, the mobile station determines the power control status in a step 501. The mobile station can be adapted to determine which base station's power control commands it follows based on a comparison of the received power control commands before combining and after combining. The mobile station then communicates the power control status to all the connected base stations in a step 503 and the base stations in response to such a communication from a mobile station select power control method in a step 505.

Below an exemplary scenario is described. First the mobile station compares the sequences of the received power control commands before combining from all the connected base stations to that after combining. The power control status can then be determined as below:

It is determined that a connected base station is power controlling the mobile station if the ratio of the received power control commands before combining from that base station are the same to the power control commands after combining is higher than a predefined threshold (e.g. 90%).

Otherwise it is regarded that the connected base station is only partly or even not power controlling the mobile station.

The mobile station then reports the power control status to the connected base stations. The reporting can be executed in a number of different manners, for example:

Periodically report: the mobile station periodically reports the determined power control status.

Event trigged report: the mobile station reports the power control status when the power control status of any of the connected base stations changes.

To further decrease signaling overhead, the mobile station can be adapted to report a special message indicating that the mobile station is power controlled by all the connected base stations is a particular criterion is met. For example, the criterion can be that the ratio that the received power control commands before combining from that base station are the same to the power control commands after combining is lower than a predefined threshold (e.g. 60%) for all the connected base stations.

The base stations the selects power control method in response to the power control status reported from the mobile station. Thus, each (connected) base station selects power control methods based on the power control status.

Using the methods and devices as described herein will provide a means for a radio base station to select a power control method that is optimal for the situation at hand. This is obtained by communicating power control status to base stations or deriving power control status in a radio base station. The radio base station is adapted to select power control method based on the power control status. Thus, a base station can select the most suitable power control improvement method, even during soft handover, thereby making make use of the advantages of different types of power control improvement methods.

The invention claimed is:

1. A method of generating power control commands in a radio base station to control the transmission power of a connected mobile station, comprising:

receiving or determining a power control status corresponding to the extent to which power control commands are currently followed by the connected mobile station, the power control status being based on a sequence of previously generated power control commands; and generating power control commands using the power control status as an input signal;

wherein the base station is configured to apply either a first or a second power control method in dependence on the power control status; and wherein the base station applies the first power control method if the power control status indicates that the previously generated power control commands are being followed to a defined degree, and otherwise applies the second power control method.

2. The method of claim 1, wherein the radio base station receives the power control status from a central node.

3. The method of claim 1, wherein the base station determines the power control status.

4. The method of claim 3, wherein the power control status is determined by analyzing the previously generated power control commands, received signal code power patterns, or both.

5. The method of claim 1, wherein the radio base station receives the power control status from a mobile station.

6. A method in a mobile station for generating a power control status for use as an input in a power control method executed in a network node of a cellular radio system to which the mobile station is connected, comprising:

determining a power control status corresponding to the extent to which power control commands are currently followed by the connected mobile station, the power control status being based on a sequence of power control commands received from the cellular radio system; and transmitting the power control status to the cellular radio system.

7. The method of claim 6, wherein the mobile terminal combines an incoming sequence of power control commands received from a plurality of base stations to produce a combined sequence of power control commands, compares the individual sequences of power control commands to the combined sequence of power control commands, and determines which of the plurality of base stations is power controlling the mobile station responsive to the comparison.

8. A radio base station adapted to generate power control commands to control the transmission power of a connected mobile station, comprising circuitry configured as:
- a selector for receiving or determining a power control status corresponding to the extent to which power control commands are currently followed by the connected mobile station, the power control status being based on a sequence of previously generated power control commands; and
- a power controller for generating power control commands using the power control status as an input signal;
- wherein the radio base station is configured to apply either a first or a second power control method in dependence on the power control status; and
- wherein the base station is configured to apply the first power control method if the power control status indicates that the previously generated power control commands are being followed to a defined degree, and otherwise apply the second power control method.

9. The radio base station of claim 8, wherein the radio base station is adapted to receive the power control status from a central node.

10. The radio base station of claim 8, wherein the radio base station is adapted to determine the power control status.

11. The radio base station of claim 10, wherein the radio base station is adapted to determine the power control status by analyzing the previously generated power control commands, received signal code power patterns, or both.

12. The radio base station of claim 8, wherein the radio base station is adapted to receive the power control status from a mobile station.

13. A mobile station adapted to generate a power control status for use as an input in a power control method executed in a network node of a cellular radio system to which the mobile station is connectable, the mobile station being configured to:
- determine a power control status corresponding to the extent to which power control commands are currently followed by the connected mobile station, the power control status being based on a sequence of previously generated power control commands; and
- transmit the power control status to the cellular radio system.

14. The mobile station of claim 13, wherein the mobile station is adapted to:
- combine an incoming sequence of power control commands received from a plurality of base stations to produce a combined sequence of power control commands;
- compare the individual sequences of power control commands to the combined sequence of power control commands; and
- determine which of the plurality of base stations is power controlling the mobile station responsive to the comparison.

* * * * *

UNITED STATES PATENT AND TRADEMARK OFFICE
CERTIFICATE OF CORRECTION

PATENT NO. : 8,929,941 B2
APPLICATION NO. : 13/264475
DATED : January 6, 2015
INVENTOR(S) : Zhang et al.

Page 1 of 1

It is certified that error appears in the above-identified patent and that said Letters Patent is hereby corrected as shown below:

On the Title Page, item (57), under "ABSTRACT", in Column 2, Line 10, delete "making make" and insert -- make --, therefor.

In the Specification

In Column 4, Line 62, delete "from form" and insert -- from --, therefor.

In Column 5, Line 23, delete "Ec/lo" and insert -- Ec/Io --, therefor.

In Column 6, Line 61, delete " $\lfloor m/n \rfloor$ " and insert -- $\lfloor m/n \rfloor$ --, therefor.

Signed and Sealed this
Seventh Day of July, 2015

Michelle K. Lee
*Director of the United States Patent and Trademark Office*